(12) United States Patent
O'Reilly

(10) Patent No.: US 9,210,845 B2
(45) Date of Patent: Dec. 15, 2015

(54) SQUARE BALER HAVING PLANETARY PLUNGER DRIVE

(71) Applicant: AGCO Corporation, Duluth, GA (US)

(72) Inventor: David W. O'Reilly, McPherson, KS (US)

(73) Assignee: AGCO Corporation, Duluth, GA (US)

( * ) Notice: Subject to any disclaimer, the term of this patent is extended or adjusted under 35 U.S.C. 154(b) by 183 days.

(21) Appl. No.: 14/101,489

(22) Filed: Dec. 10, 2013

(65) Prior Publication Data

US 2014/0158002 A1 Jun. 12, 2014

Related U.S. Application Data

(60) Provisional application No. 61/735,869, filed on Dec. 11, 2012.

(51) Int. Cl.
*A01F 15/08* (2006.01)

(52) U.S. Cl.
CPC .................................. *A01F 15/0841* (2013.01)

(58) Field of Classification Search
CPC ..... A01F 15/0841; B30B 9/306; B30B 1/266; F16H 37/041; F16H 1/28; F16H 1/2809; F16H 1/2827; F16H 3/725; F16H 37/046; F16H 2037/0866; F16H 2200/0034; F16H 2200/207

USPC .............. 100/188 R, 280, 282; 56/10.8, 341; 475/204, 205

See application file for complete search history.

(56) References Cited

U.S. PATENT DOCUMENTS

| | | | | | |
|---|---|---|---|---|---|
| 2,505,857 | A | * | 5/1950 | Gregory | 475/8 |
| 2,518,824 | A | * | 8/1950 | Simpson | 475/284 |
| 2,721,487 | A | * | 10/1955 | Morey et al. | 475/134 |
| 3,482,469 | A | * | 12/1969 | Mori | 475/54 |
| 3,650,162 | A | * | 3/1972 | Leising et al. | 477/128 |
| 4,357,840 | A | * | 11/1982 | Winzeler | 475/205 |
| 4,615,238 | A | * | 10/1986 | Cheatum | 475/263 |
| 6,105,353 | A | * | 8/2000 | Mohr et al. | 56/341 |
| 2004/0166980 | A1 | * | 8/2004 | Supina et al. | 475/5 |
| 2010/0170407 | A1 | * | 7/2010 | Vu | 100/179 |
| 2013/0152805 | A1 | * | 6/2013 | Roth | 100/35 |

* cited by examiner

*Primary Examiner* — Jimmy T Nguyen

(57) ABSTRACT

A powered square baler is operable to form a bale by compressing loose material. The powered square baler broadly includes a chassis, a plunger assembly, and a plunger drive. The chassis includes a baler frame that presents a baling chamber to receive the loose material. The plunger assembly includes a reciprocating plunger head and a pair of connecting arms attached to the plunger head. The reciprocating plunger head is slidably mounted relative to the frame and is operable to reciprocate into and out of the chamber and apply a compressive force to the loose material. The plunger drive includes a pair of planetary gear trains and a common drive shaft that powers both of the gear trains, with each gear train drivingly connected to a corresponding one of the connecting arms to cooperatively power the plunger assembly.

8 Claims, 12 Drawing Sheets

SQUARE BALER HAVING PLANETARY PLUNGER DRIVE

CROSS REFERENCE TO RELATED APPLICATION

This application claims the benefit of U.S. Provisional Application No. 61/735,869, entitled SQUARE BALER HAVING PLANETARY PLUNGER DRIVE filed Dec. 11, 2012, which is hereby incorporated by reference in its entirety.

BACKGROUND OF THE INVENTION

1. Field of Invention

This invention relates to a baling apparatus, and more particularly to a square baler having planetary plunger drive.

2. Description of Related Art

Conventional square hay balers include a reciprocating plunger that slides into and out of a baling chamber. As the chamber receives loose hay material, the plunger slides into the chamber during a compaction stroke to compress the loose hay material into the form of a bale. Such balers also typically include a gearbox that transmits power to the reciprocating plunger and includes intermeshing gears.

However, prior art square hay balers have certain deficiencies. For instance, conventional hay balers apply very high forces to the plunger in order to complete the compaction stroke. Because these forces are transmitted by the gearbox, the gearbox must be designed to accommodate this loading. Prior art gear trains are prone to fail when exposed to such high forces.

OVERVIEW OF THE INVENTION

In one embodiment, the invention is directed to a powered square baler operable to form a bale by compressing loose material. The powered square baler broadly includes a chassis, a plunger assembly, and a plunger drive. The chassis includes a baler frame that presents a baling chamber to receive the loose material. The plunger assembly includes a reciprocating plunger head and a pair of connecting arms attached to the plunger head. The reciprocating plunger head is slidably mounted relative to the frame and is operable to reciprocate into and out of the chamber and apply a compressive force to the loose material. The plunger drive includes a pair of planetary gear trains and a common drive shaft that powers both of the gear trains, with each gear train drivingly connected to a corresponding one of the connecting arms to cooperatively power the plunger assembly.

These and other features and advantages of this invention are described in, or are apparent from, the following detailed description of various exemplary embodiments of the systems and methods according to this invention.

BRIEF DESCRIPTION OF THE DRAWINGS

The above mentioned and other features of this invention will become more apparent and the invention itself will be better understood by reference to the following description of embodiments of the invention taken in conjunction with the accompanying drawings, wherein.

Corresponding reference characters indicate corresponding parts throughout the views of the drawings.

DETAILED DESCRIPTION OF EXEMPLARY EMBODIMENTS

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

Figure 1:
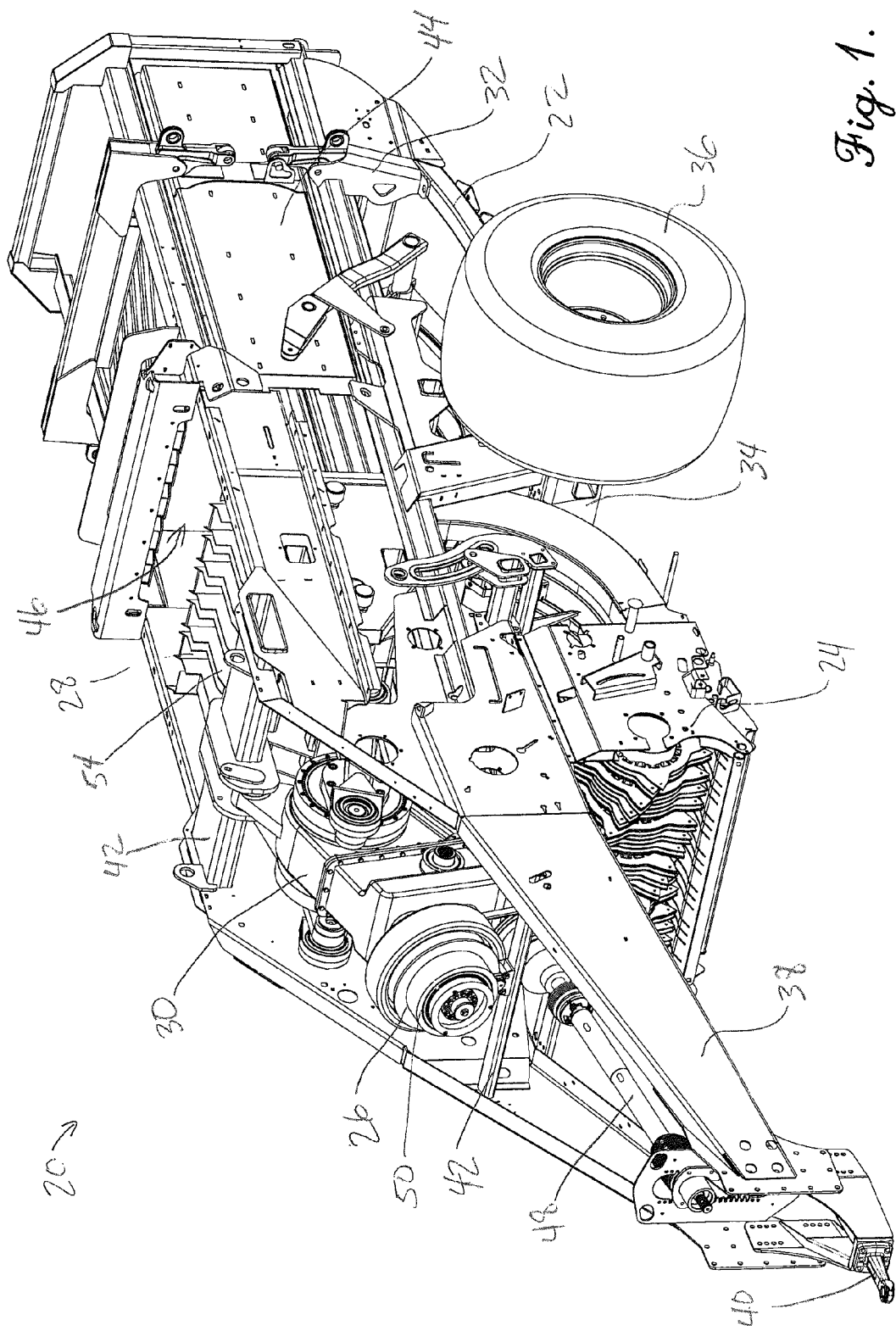
FIG. 1 is a fragmentary front perspective of a square baler constructed in accordance with a first embodiment of the present invention, with the square baler including a wheeled chassis, a windrow pickup header, a drive shaft, a transmission, a plunger drive, and a plunger assembly, and showing the plunger assembly operably received by a baling chamber presented by the chassis.

Turning initially to FIG. 1, a square baler 20 is constructed in accordance with a preferred embodiment of the present invention. The illustrated baler 20 is designed to collect loose hay and form the loose hay into hay bales. However, the principles of the present invention are applicable where the baler 20 forms bales from other loose materials, such as other vegetation or waste material. The square baler 20 preferably includes a wheeled chassis 22, a windrow pickup header 24, a transmission 26, a plunger assembly 28, and a planetary plunger drive 30.

The wheeled chassis 22 is conventional and is constructed so that the baler 20 can be towed in the usual manner by a tractor (not shown). The chassis 22 includes a baler frame 32, an axle 34 that supports the baler frame 32, and ground wheels 36 rotatably mounted on the axle 34.

The illustrated baler frame 32 preferably includes a tow bar assembly 38 operable to be attached to the tractor with a hitch 40. The baler frame 32 further includes lateral supports 42. The baler frame 32 also preferably includes an enclosed bed 44 that presents a baling chamber 46. As will be discussed, the bed 44 slidably receives the plunger assembly 28 so that the plunger can reciprocate into and out of the baling chamber 46 along a longitudinal chamber axis. More specifically, the plunger travels into the baling chamber 46 during a compaction stroke and out of the baling chamber 46 during a retraction stroke.

The header 24 is operably supported by the baler frame 32 at a location spaced between the hitch 40 and axle 34. In the usual manner, the header 24 is operable to collect loose material from the ground and feed the collected material toward the baling chamber 46.

Figure 2:
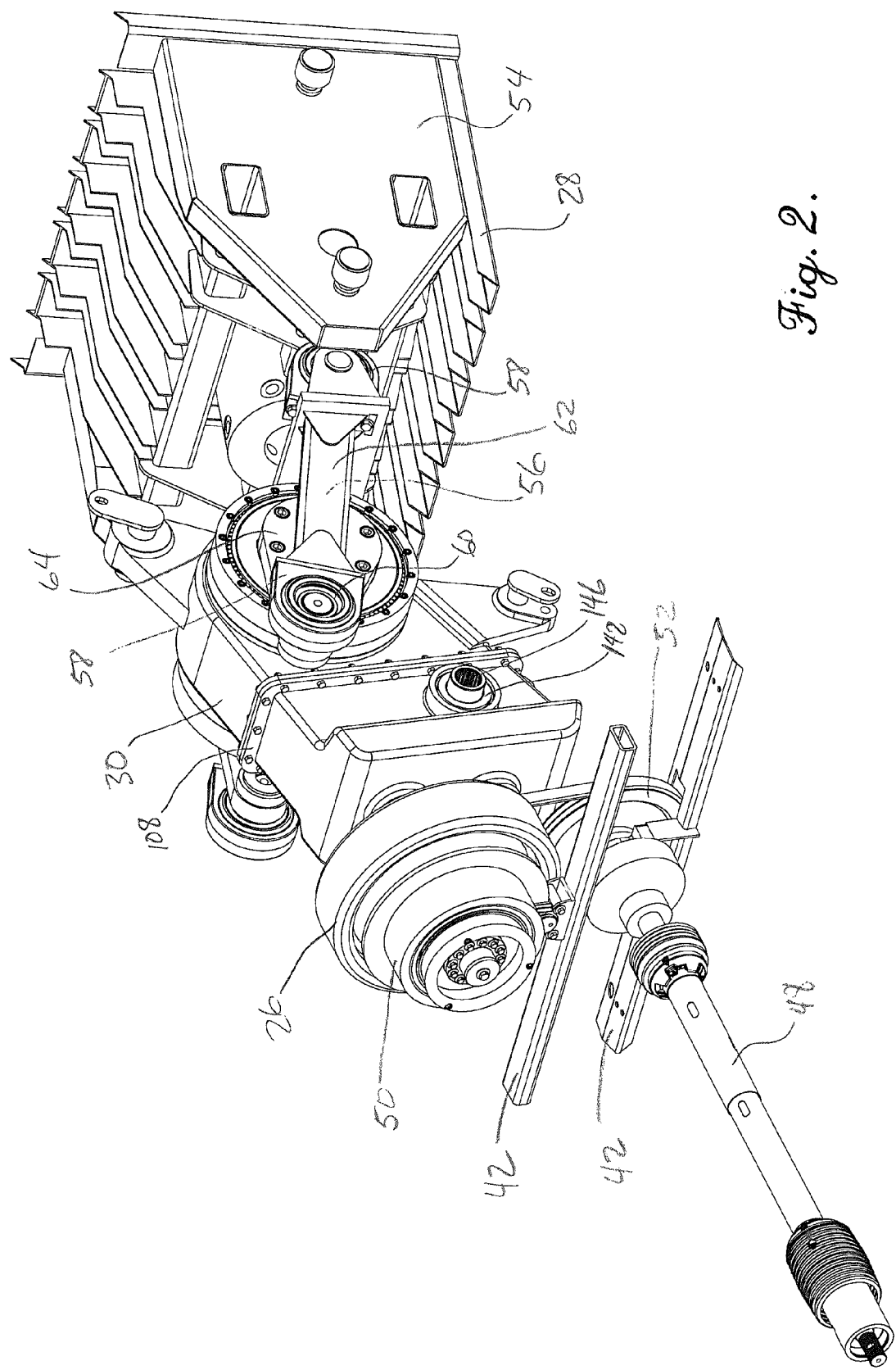
FIG. 2 is a fragmentary front perspective of the square baler shown in FIG. 1, showing the drive shaft, transmission, plunger drive, and plunger assembly, with the plunger drive including crank arms attached to connecting rods of the plunger assembly, and the connecting rods attached to a plunger head of the plunger assembly, and with the crank arms rotated so that the plunger assembly is in an outermost location relative to the baling chamber.
Figure 3:
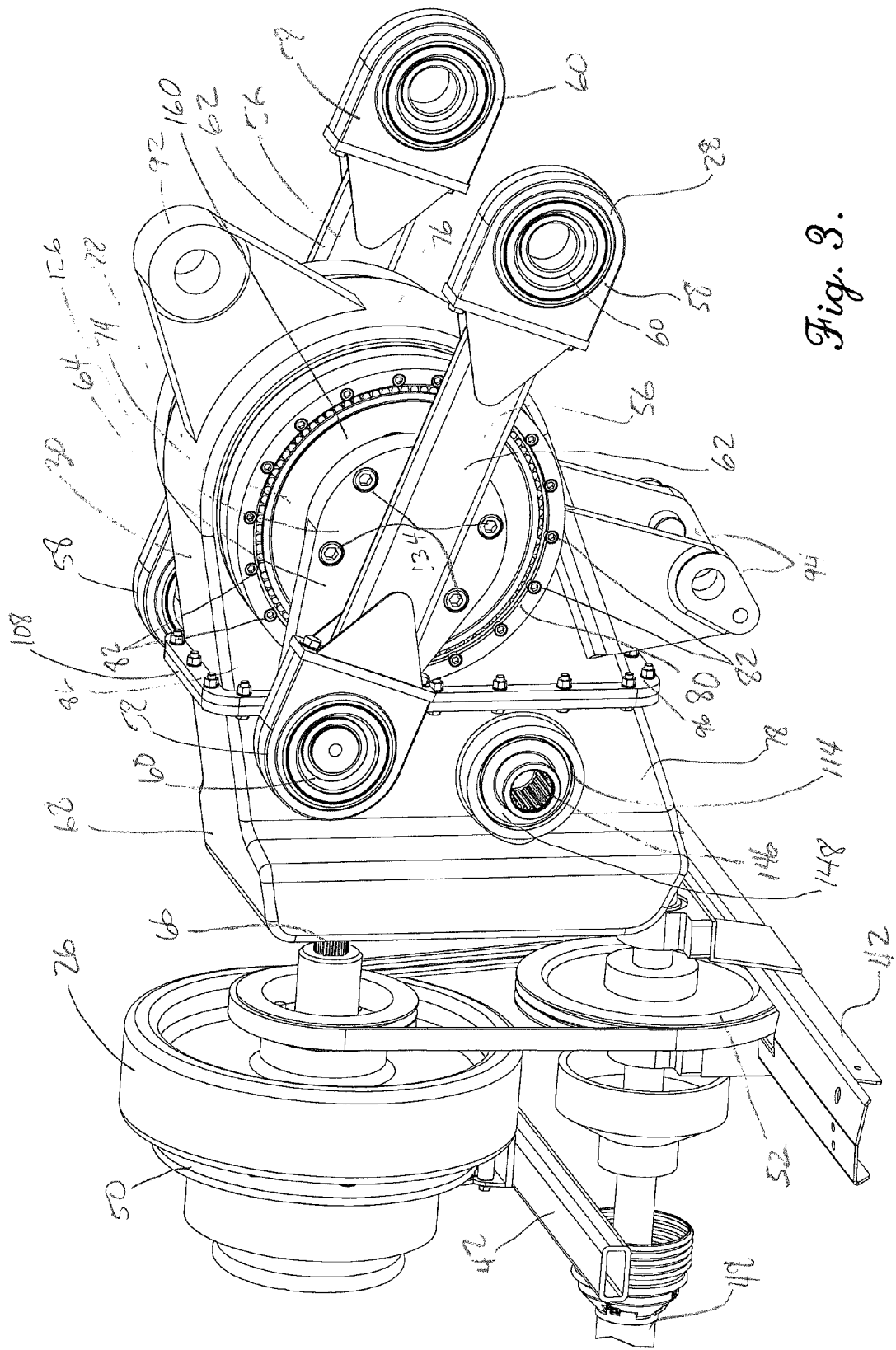
FIG. 3 is a fragmentary side perspective of the square baler shown in FIGS. 1 and 2, showing the drive shaft, transmission, plunger drive, and connecting rods.

Turning to FIGS. 1-3, the transmission 26 serves to transmit power from a baler input shaft 48 to the plunger drive 30. Preferably, the illustrated transmission 26 reduces the rotational speed from the baler input shaft 48 to an input shaft of the plunger drive 30. The baler input shaft 48 is conventional and is operable to be attached to a power takeoff shaft (not shown) of the tractor. The transmission 26 preferably includes a planetary gear drive 50 and a belt drive 52 to provide the speed reduction. However, it is within the ambit of the present invention where an alternative transmission is used.

The plunger assembly 28 is constructed to reciprocate into and out of the chamber 46 along the chamber axis to form a bale (not shown). In such operation, the plunger assembly 28 compacts and forms material in the chamber 46 so that the bale is formed. The plunger assembly 28 preferably includes a plunger head 54 and connecting rods 56.

The plunger head 54 is preferably slidable into the baling chamber 46 during a compaction stroke and out of the baling chamber 46 during a retraction stroke. The plunger head 54 and baling chamber 46 cooperatively define an enclosed chamber volume. The volume has a maximum value when the plunger head 54 is at an outermost location relative to the chamber 46 (see FIGS. 2 and 3). Conversely, the volume has a minimum value when the plunger head 54 is at an innermost location relative to the chamber 46 (see FIGS. 4 and 6). While the plunger head 54 slides along a straight line between the innermost and outermost locations, it is within the scope of the present invention where the plunger head 54 slides along a curvilinear line.

The connecting rods 56 each include end housings 58, bearings 60 mounted in each of the end housings 58, and an arm 62 that interconnects the end housings. Each connecting rod 56 is pivotally attached to a crank arm 64 of the plunger drive 30 at one end and to the plunger head 54 at the other end.

The connecting rods 56 drivingly interconnect the crank arms 64 and plunger head 54 so that rotation of the crank arms 64 causes reciprocating sliding movement of the plunger head 54. The crank arms 64 and plunger assembly 28 operate so that the crank arms 64 are rotatable between the outermost location (see FIGS. 2 and 3) and the innermost location (see FIGS. 4 and 6). While the illustrated connecting rods 56 are preferred, it is also within the ambit of the present invention where alternative structure drivingly interconnects the plunger drive 30 and the plunger assembly 28.

Turning to FIGS. 4-8, the plunger drive 30 is operable to transmit power from the transmission 26 to the plunger assembly 28. As will be discussed, the plunger drive 30 is particularly designed to accommodate the transmission of high torque loads so that correspondingly high compression forces can be applied to material in the baling chamber 46 by the plunger head 54. At the same time, the illustrated plunger drive 30 preferably provides a suitable speed reduction from a drive input shaft 66 to the pair of rotating crank arms 64. Again, the plunger assembly 28 is preferably powered by the plunger drive 30 so that the plunger head 54 reciprocates into and out of the chamber 46. The illustrated plunger drive 30 preferably includes a housing assembly 68, the drive input shaft 66, an auxiliary gear train 70, bevel gear set 72, a pair of planetary gear trains 74, and the rotating crank arms 64. As will be explained in greater detail, each crank arm 64 is associated with and powered by a corresponding one of the planetary gear trains 74.

The housing assembly 68 is configured to contain the gear trains 74 during operation of the plunger drive 30. The housing assembly 68 preferably includes a housing 76, a forward cover 78, retaining rings 80, and fasteners 82, with ring gears 84 of the planetary gear trains 74 being attached to the housing assembly 68. The housing 76 is preferably unitary and includes side walls 86, intermediate wall 88, interior bracket 90, and exterior brackets 92,94. The side walls 86 are interconnected by the intermediate wall 88, with the intermediate wall 88 extending continuously along the top, aft end, and bottom of the housing 76. The bracket 92 is fixed to the intermediate wall 88 adjacent the aft end. The brackets 94 are fixed to the side and intermediate walls 86,88 along the bottom of the housing 76.

Figure 5:
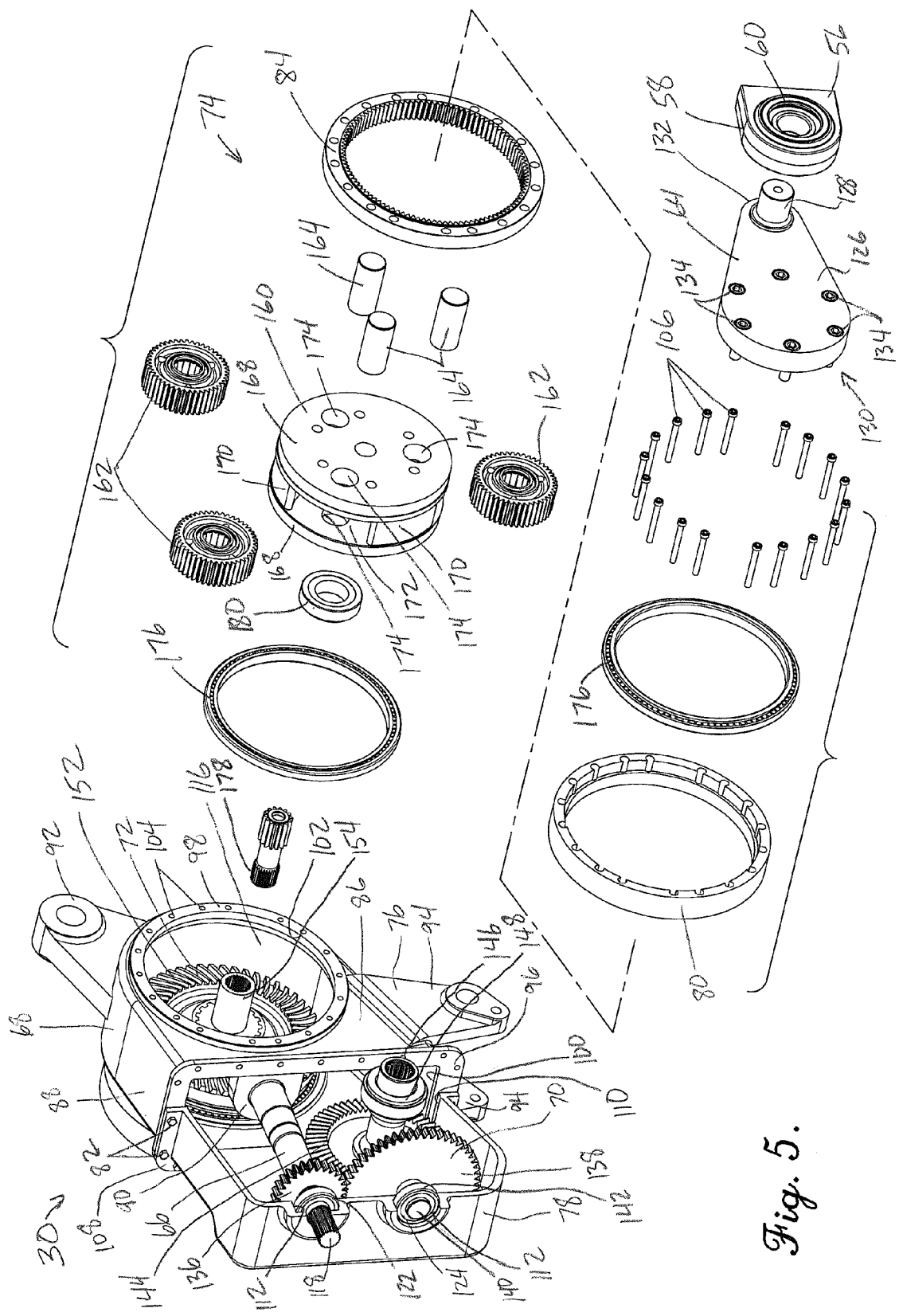
FIG. 5 is a fragmentary exploded view of the plunger drive and connecting rods shown in FIGS. 1-4.
Figure 6:
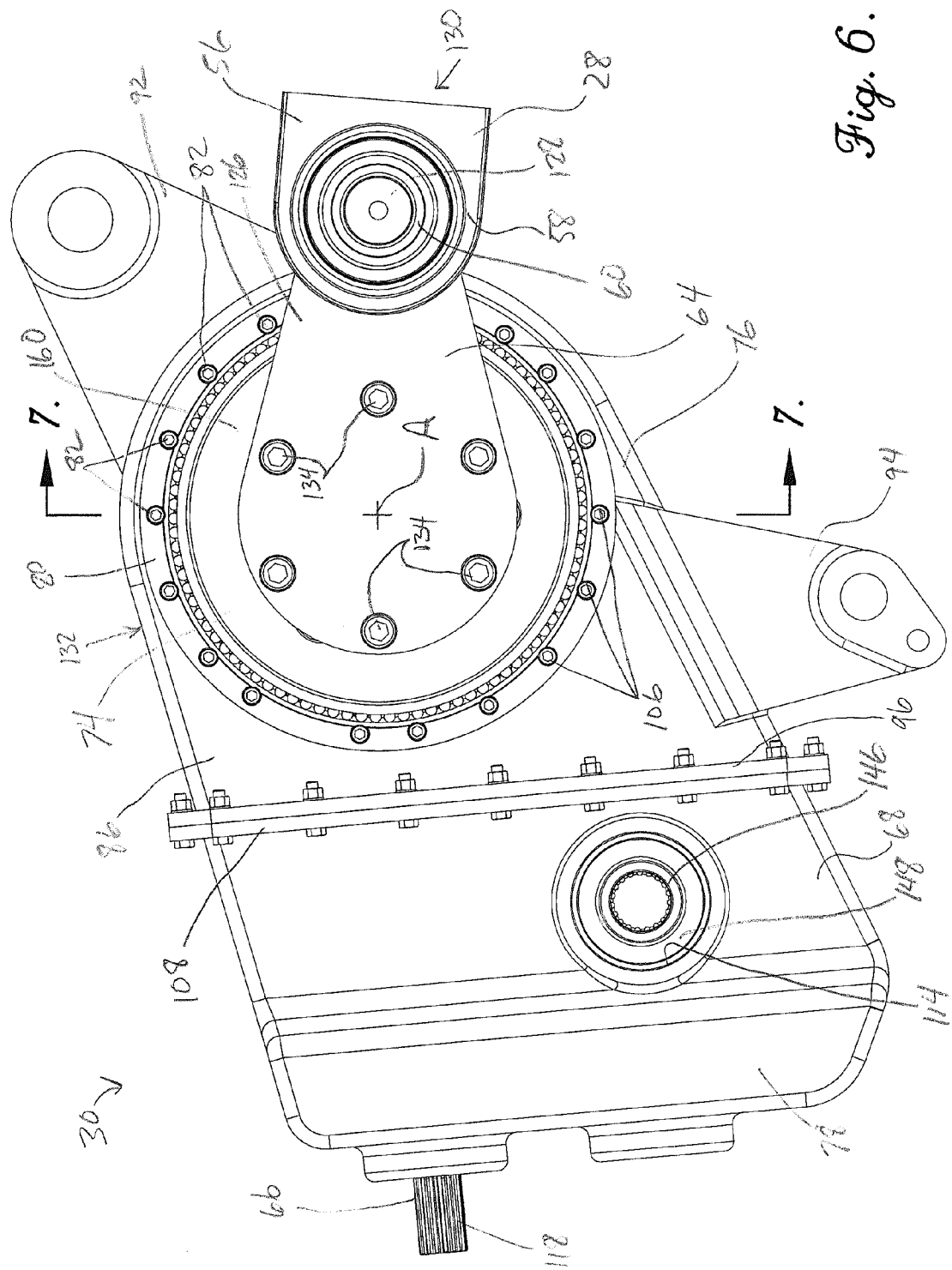
FIG. 6 is a fragmentary side elevation of the plunger drive and connecting rods shown in FIGS. 1-5, showing the crank arm rotated so that the plunger assembly is located in an innermost location relative to the baling chamber.
Figure 7:
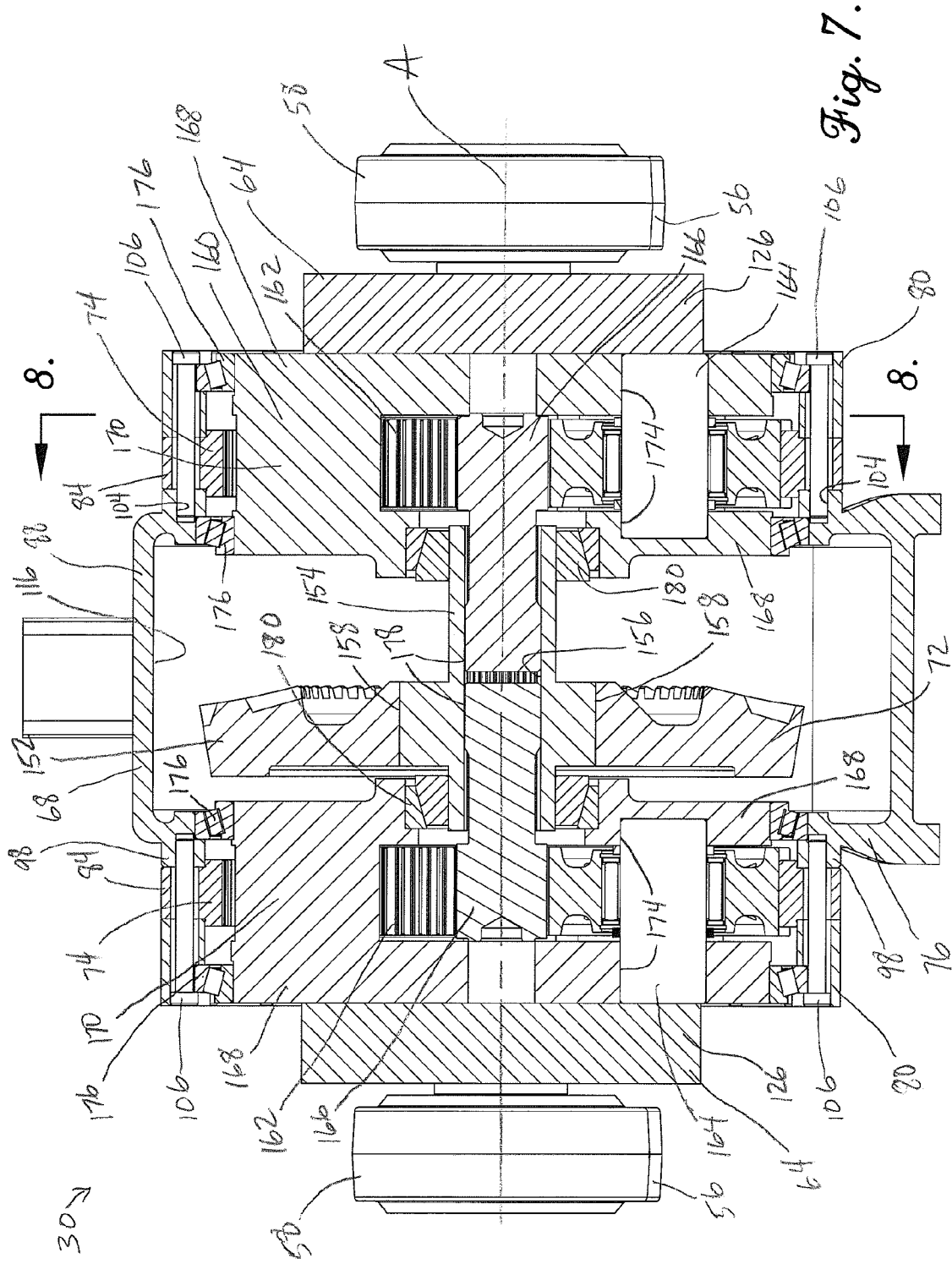
FIG. 7 is a cross section of the plunger drive and connecting rods taken along line 7-7 in FIG. 6.
Figure 8:
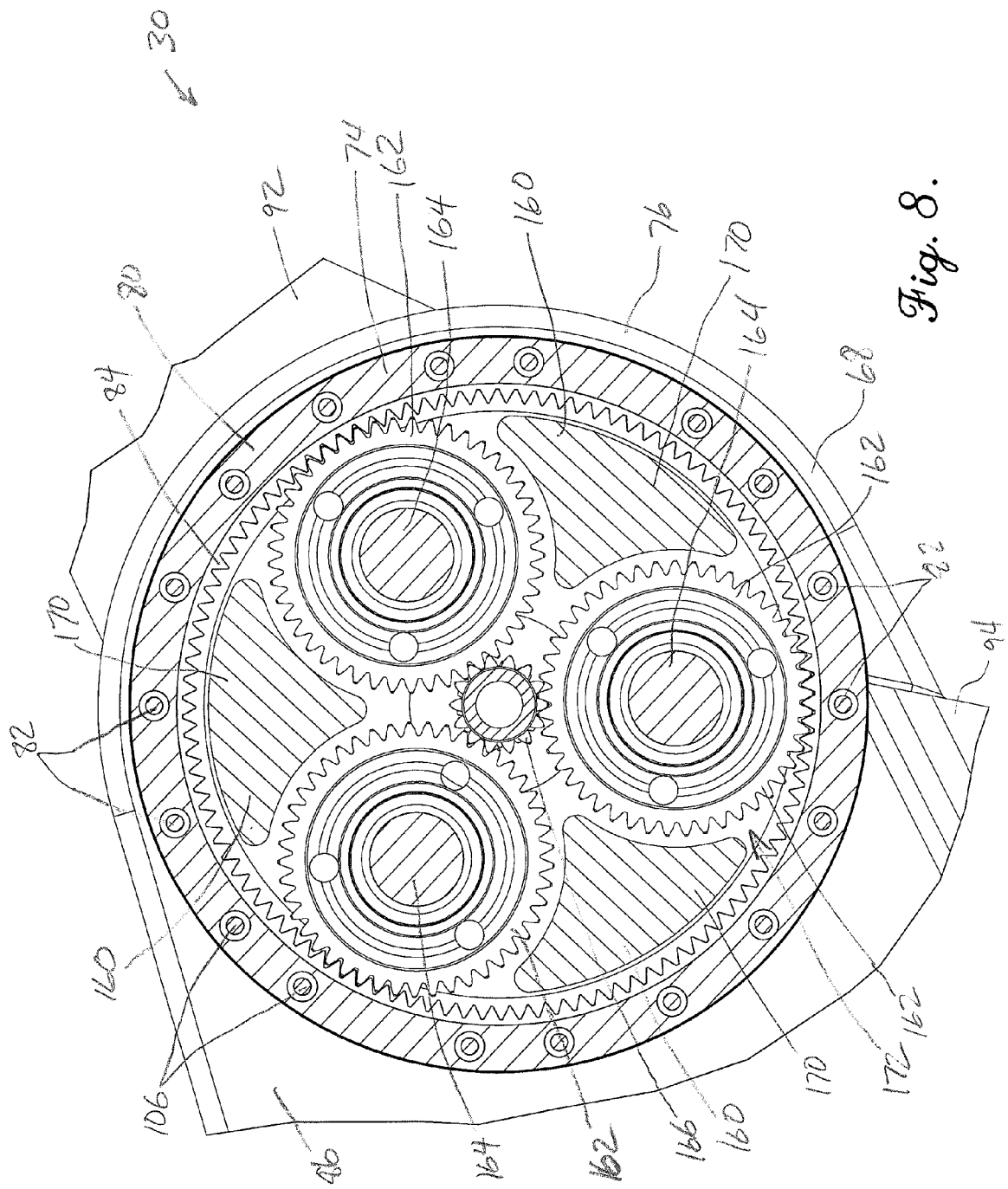
FIG. 8 is a cross section of the plunger drive taken along line 8-8 in FIG. 7.
Figure 9:
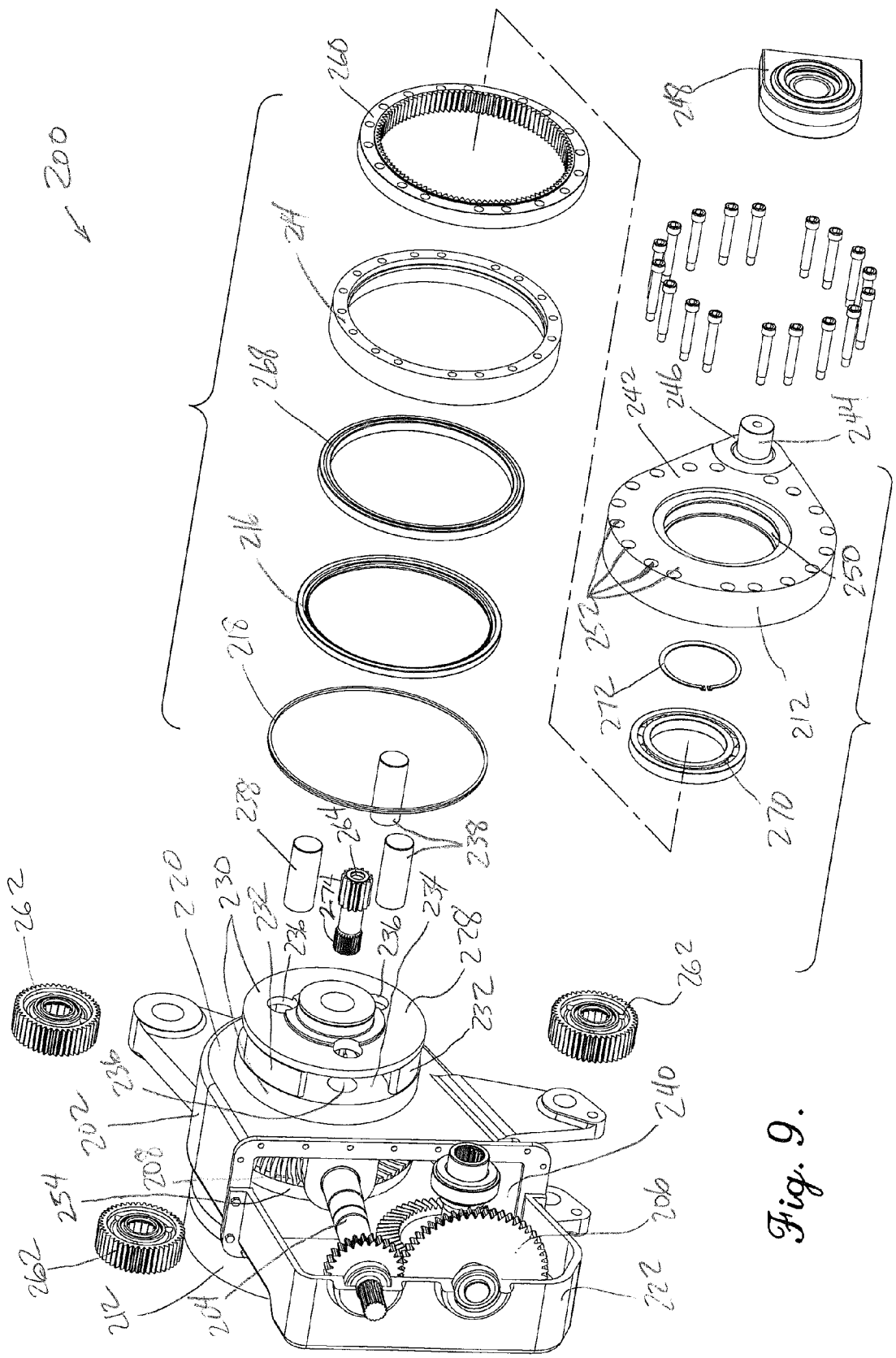
FIG. 9 is a fragmentary exploded view of a plunger drive and connecting rods constructed in accordance with a second embodiment of the present invention, with the plunger drive including a housing assembly, a drive input shaft, an auxiliary gear train, bevel gear set, a pair of planetary gear trains, wipers, bearings, fasteners, and crank arms.
Figure 10:
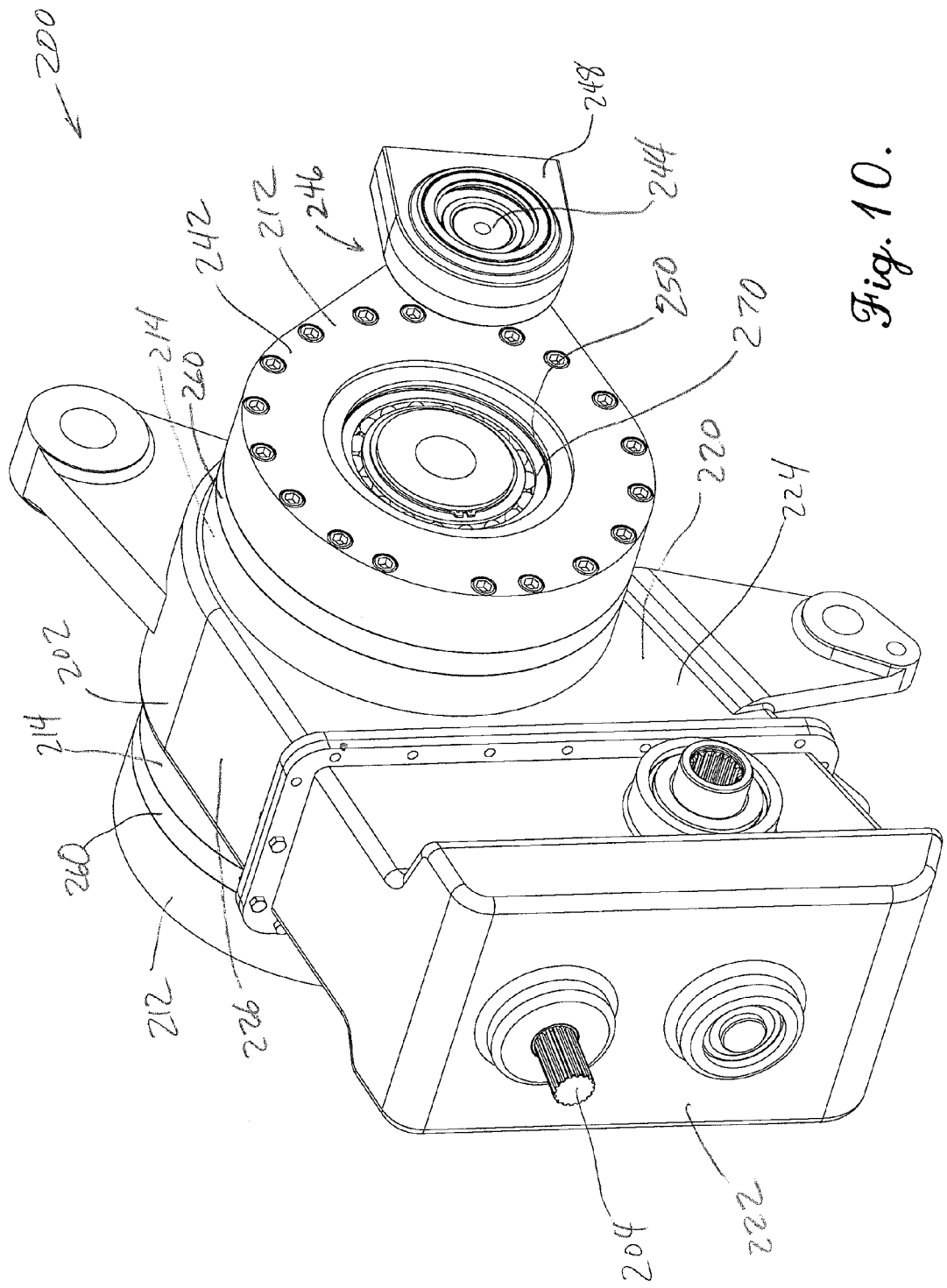
FIG. 10 is a fragmentary front perspective of the plunger drive and connecting rods shown in FIG. 9.
Figure 11:
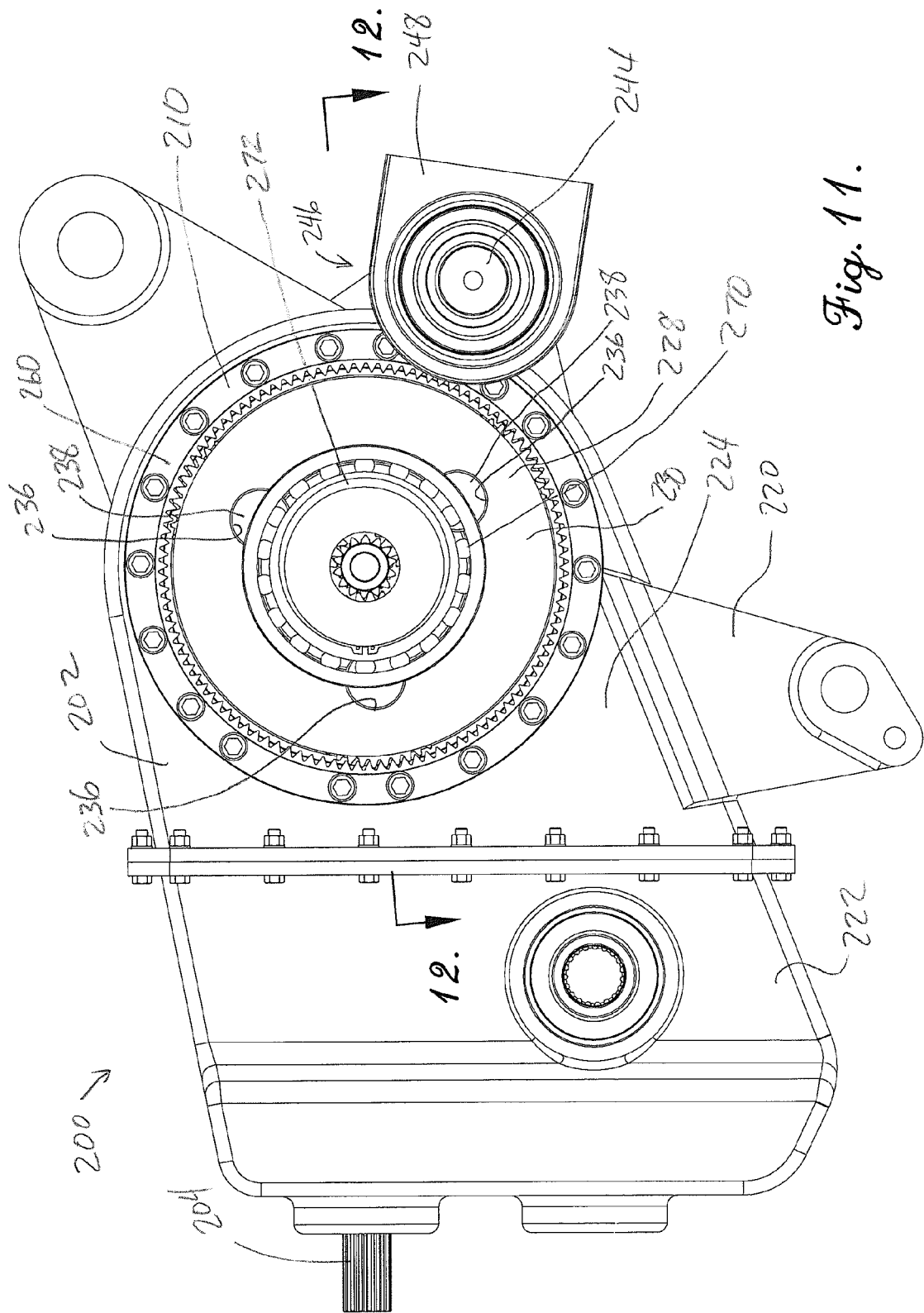
FIG. 11 is a fragmentary side elevation of the plunger drive and connecting rods shown in FIGS. 9 and 10, with the crank arm being removed to depict the ring gear of the planetary gear train in meshing engagement with corresponding planet gears.
Figure 12:
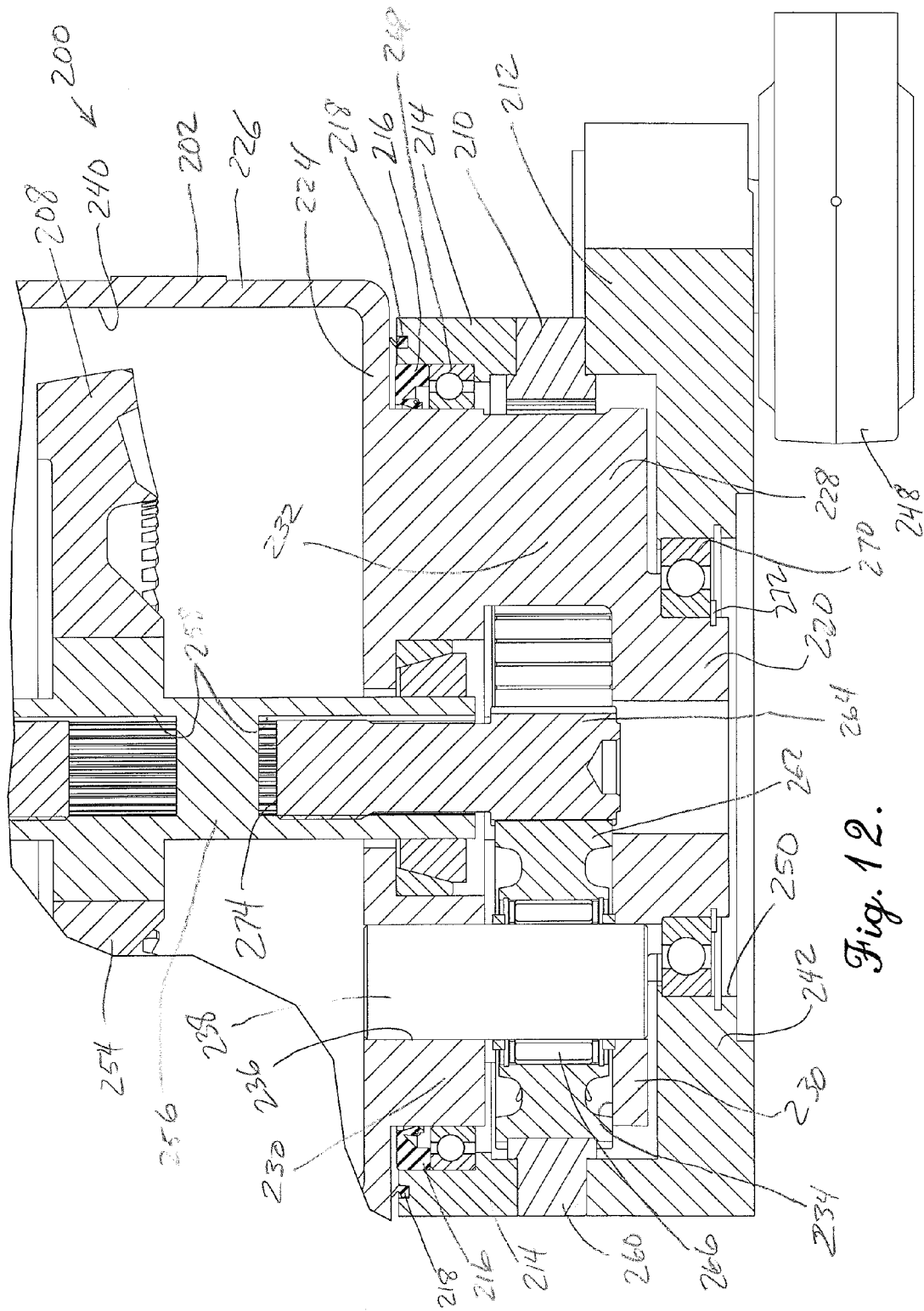
FIG. 12 is a cross section of the plunger drive and connecting rods taken along line 12-12 in FIG. 11, and showing the crank arm attached to the ring gear.

The housing 76 also includes a forward flange 96 and side flanges 98 (see FIGS. 5 and 6). The forward flange 96 is operable to receive the cover 78 and presents a generally rectangular opening 100. The side flanges 98 present corresponding circular openings 102 and threaded bores 104. Preferably, the side flanges 98 are each attached to a corresponding ring gear 84 and retaining ring 80 that are secured to the side flanges 98 with fasteners 106.

The cover 78 is substantially unitary and includes a flange 108 that presents a generally rectangular aft opening 110. The cover 78 further presents forward openings 112 and opposite side openings 114. The cover 78 is secured to the housing 76 by fasteners 82 that interconnect the flanges (see FIGS. 5 and 6). Thus, the housing 76 and cover 78 cooperatively present an enclosed chamber 116 that receives the gear trains 70,74 and bevel gear set 72.

Figure 4:
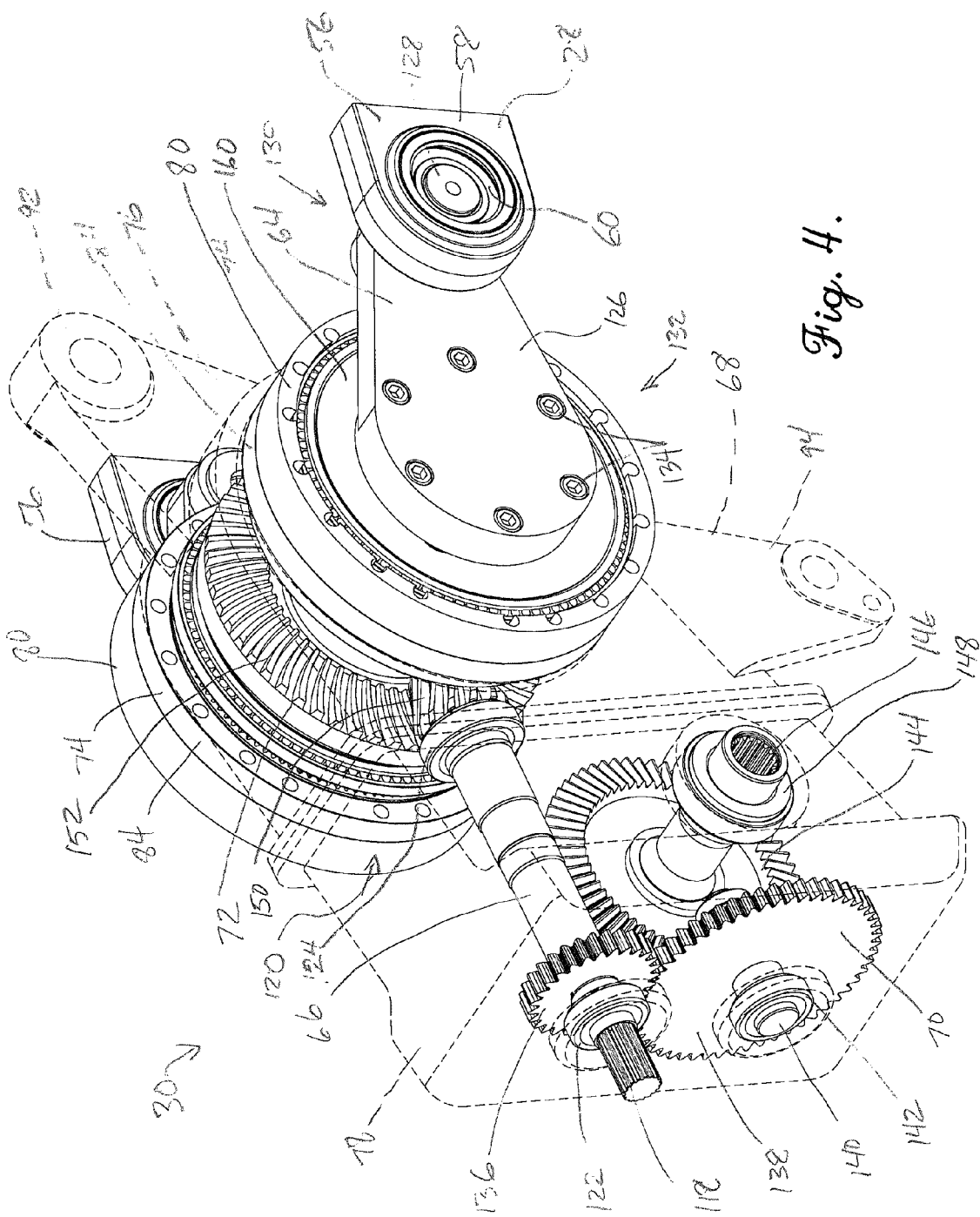
FIG. 4 is a fragmentary front perspective of the plunger drive and connecting rods shown in FIGS. 1-3, with a housing assembly of the plunger drive shown in hidden lines to depict a drive input shaft, auxiliary gear train, bevel gear set, a pair of planetary gear trains, and the crank arms of the plunger drive.

The drive input shaft 66 is preferably unitary and presents a forward splined end 118 and an aft end 120 (see FIG. 4). The drive input shaft 66 is rotatably supported in the housing assembly by bearings 122,124 located adjacent respective ends, with the bearing 122 being mounted in the upper one of the forward openings 112 and the bearing 124 being mounted in the interior bracket 90 (see FIG. 4). Preferably, the drive input shaft 66 is rotatably mounted to extend through the upper one of the forward openings 112 so that the splined end 118 is located exterior to the housing assembly 68. The illustrated plunger drive 30 preferably includes a single drive input shaft 66 that is common to and powers both of the planetary gear trains 74. However, it is within the scope of the present invention where a pair of drive input shafts 66 are provided, with each powering a respective one of the planetary gear trains 74.

Turning to FIGS. 4-6, each crank arm 64 includes a plate 126 and a shaft 128. The plate 126 is elongated and presents opposite arm ends 130,132. The shaft 128 is fixed to arm end 132. The other arm end 130 presents holes that receive fasteners 134 for attachment to the planetary plunger drive 30. Each shaft 128 is removably attached to an end of a corresponding one of the connecting rods 56.

The auxiliary gear train 70 is preferably powered by the drive input shaft 66 and includes a drive gear 136 mounted on the drive input shaft 66 and a driven gear 138 mounted on a longitudinal shaft 140, with the shaft 140 being supported by a bearing 142 (see FIG. 4). The bearing 142 is mounted in the lower one of the forward openings 112. The drive and driven gears 136,138 are in meshing engagement with each other.

The auxiliary gear train 70 also includes a drive bevel gear (not shown) mounted on the shaft 140 so that the drive bevel gear and the driven gear 138 rotate with each other. The auxiliary gear train 70 further includes a driven bevel gear 144 mounted on a transverse auxiliary output shaft 146 adjacent one end. The auxiliary output shaft 146 is rotatably mounted on bearings 148, with the bearings 148 being mounted in openings 114. The shafts 140,146 are mounted so that the drive bevel gear and the driven bevel gear 144 are in meshing engagement with each other. Thus, rotation of the drive input shaft 66 results in corresponding rotation of the auxiliary output shaft 146. While the baler 20 preferably includes the illustrated gear train 70, it is within the scope of the present invention where the gear train 70 is alternatively configured. Furthermore, the baler 20 could be devoid of gear train 70.

Turning to FIGS. 4-7, the bevel gear set 72 preferably drivingly connects the drive input shaft 66 and both of the planetary gear trains 74. The illustrated bevel gear set 72 includes a drive bevel gear 150, a driven bevel gear 152, and a hollow shaft 154. The hollow shaft 154 presents a splined bore 156 and an outer surface that includes a splined surface 158 (see FIGS. 5 and 7). The hollow shaft 154 is preferably mounted to rotate about lateral axis A (see FIG. 7). The driven bevel gear 152 presents a splined bore and is mounted on the splined surface 158 (see FIG. 7). The drive bevel gear 150 is mounted on the aft end 120 of the drive input shaft 66 so that the bevel gears 150,152 are in meshing engagement with each other (see FIG. 4). Thus, rotation of the drive input shaft 66 causes corresponding rotation of the driven bevel gear 152, with the driven bevel gear 152 serving to drive the planetary gear trains 74.

Turning to FIGS. 5-8, each of the illustrated planetary gear trains 74 preferably transmits power from the bevel gear set 72 to a corresponding one of the crank arms 64. Each planetary gear train 74 preferably includes one of the ring gears 84, a carrier 160, three (3) planet gears 162, three (3) shafts 164, and a sun gear 166. The ring gears 84 are preferably spaced laterally from one another and substantially axially aligned with the lateral axis A.

The carrier 160 includes a pair of plates 168 and walls 170 that interconnect the plates 168 to cooperatively form a rigid gear carrying structure and present an open space 172 between the plates 168. The plates 168 also present bores 174 that receive shafts 164. The planet gears 162 are rotatably mounted on respective shafts 164 within the space 172.

The carrier 160, planet gears 162, and shafts 164 of each planetary gear train 74 are rotatably mounted on the housing assembly 68 with roller bearings 176. When mounted in this manner, the planet gears 162 and the corresponding ring gear 84 are in meshing engagement with each other. Thus, rotation of the planet gears 162 causes rotation of the carrier 160 relative to the ring gear 84 and the housing assembly 68. Furthermore, the carriers 160 are preferably substantially axially aligned so that both carriers 160 are rotatable about lateral axis A. While each illustrated gear train 74 preferably includes three (3) planet gears 162, it is within the scope of the present invention where an alternative number of planet gears 162 are used to transmit torque between the sun gear 166 and the ring gear 84. However, it is most preferred where the gear train 74 includes at least three (3) planet gears 162.

The carrier 160 of each planetary gear train 74 is also preferably removably attached to a corresponding one of the crank arms 64 with fasteners 134. Thus, the carrier 160 and the corresponding crank arm 64 are rotatable with one another.

The sun gear 166 is preferably unitary and is formed as part of a shaft that presents a splined shaft end 178. The shaft is mounted so that the splined shaft end 178 extends into the splined bore 156, with the hollow shaft 154 being rotatably supported on the carriers 160 by bearings 180. Thus, the illustrated sun gears 166 are preferably substantially axially aligned with the lateral axis A. Also, each sun gear 166 is mounted in meshing engagement with the corresponding planet gears 162. Thus, rotation of the driven bevel gear 152 causes rotation of the sun gear 166. Rotation of the sun gear 166 causes rotation of the planet gears 162, which causes rotation of the carrier 160 and the crank arm 64.

While the illustrated planetary gear trains 74 are substantially aligned with the lateral axis A, for some aspects of the present invention, the gear trains 74 could be axially offset from each other.

Each of the planetary gear trains 74 is preferably constructed with the ring gear 84 fixed relative to the housing 76 so that rotation of the sun gear 166 causes rotation of the carrier 160. However, as will be shown in a subsequent embodiment, the carrier 160 could be fixed relative to the housing 76 so that rotation of the sun gear 166 causes rotation of the ring gear 84.

In operation, the baler 20 is powered by driving the baler input shaft 48 so that the plunger is reciprocated into and out of the baling chamber 46. Rotation of the baler input shaft 48 powers the belt drive 52 and the planetary gear drive 50, with the planetary gear drive 50 powering the drive input shaft 66 of the plunger drive 30. Rotation of the drive input shaft 60 powers the bevel gear set 72 and the planetary gear trains 74, with the planetary gear trains 74 driving the crank arms 64. Thus, rotation of crank arms 64 causes reciprocating movement of the plunger head 54.

Turning to FIGS. 9-12, an alternative plunger drive 200 is constructed in accordance with a second embodiment of the present invention. For the sake of brevity, the remaining description will focus primarily on the differences of this alternative embodiment from the preferred embodiment described above.

The alternative plunger drive 200 preferably includes an alternative housing assembly 202, a drive input shaft 204, an auxiliary gear train 206, an alternative bevel gear set 208, alternative planetary gear trains 210, alternative rotating crank arms 212, mounting rings 214, and endless wipers 216,218.

The housing assembly 202 preferably includes a housing 220 and a forward cover 222. The housing 220 is unitary and includes, among other things, side walls 224 and an intermediate wall 226.

The housing 220 further includes gear carriers 228 fixed to corresponding side walls 224. Each carrier 228 includes a pair of plates 230 and walls 232 that interconnect the plates 230 to cooperatively form a rigid gear carrying structure and present an open space 234 between the plates 230. The plates 230 also present bores 236 that receive shafts 238.

The cover 222 is substantially unitary and is removably secured to the housing 220. The housing 220 and cover 222 cooperatively present a chamber 240 that receives the gear trains 206,210 and gear set 208 (see FIGS. 9 and 12).

Each crank arm 212 includes a plate 242 and a shaft 244. The plate 242 is elongated and presents an arm end 246. The shaft 244 is fixed to arm end 246. The shaft 244 is removably and rotatably attached to an end of a corresponding connecting rod 248. The plate 242 also presents an opening 250 and holes 252 spaced about the opening 250, with the holes 252 receiving fasteners for attachment of the plate 242 to the respective planetary gear train 210.

The bevel gear set 208 preferably drivingly connects the drive input shaft 204 and the planetary gear trains 210. The bevel gear set 208 includes a drive bevel gear (not shown), a driven bevel gear 254, and an alternative shaft 256. The shaft 256 presents opposite splined bores 258 (see FIG. 12).

The illustrated planetary gear trains 210 cooperatively transmit power from the bevel gear set 208 to the crank arms 212. Each planetary gear train 210 preferably includes a ring gear 260, planet gears 262, shafts 238, and sun gear 264. The shafts 238 are inserted into the bores 236 presented by the gear carrier 228. The planet gears 262 each include a roller bearing 266 for rotatably mounting the planet gears 262 on respective shafts 238 within the space 234.

Each ring gear 260 is preferably rotatably mounted relative to the housing assembly 202 so that the ring gear 260 is operable to spin relative thereto. The ring gear 260 is connected to the corresponding crank arm 212 and mounting ring 214 with fasteners. The mounting ring 214 is rotatably mounted on the housing 220 with ball bearing 268. The crank arm 212 is rotatably mounted on the housing 220 with ball bearing 270. The ball bearing 270 is secured within the opening 250 of the crank arm 212 with a snap ring 272. Thus, the mounting ring 214, ring gear 260, and crank arm 212 are interconnected and mounted on the housing 220 so as to be rotatable with each other. The mounted ring gear 260 is in meshing engagement with the planet gears 262. Consequently, rotation of the planet gears 262 causes rotation of the ring gear 260 and crank arm 212 relative to the gear carrier 228 and other parts of the housing 220.

The sun gear 264 presents a splined shaft end 274 that extends into the respective one of the splined bores 258. The sun gear 264 is mounted in meshing engagement with the planet gears 262. Thus, rotation of the sun gear 264 causes rotation of the planet gears 262, which causes rotation of the ring gear 260 and the crank arm 212.

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments. Accordingly, other aspects and a more comprehensive understanding of the invention may be obtained by referring to the detailed description of the exemplary embodiments taken in conjunction with the accompanying drawings.

What is claimed is:

1. A powered square baler operable to form a bale by compressing loose material, the powered square baler comprising:
    a chassis having a baler frame forming a baling chamber to receive the loose material;
    a plunger assembly having a reciprocating plunger head and a pair of crank arms attached to the plunger head, the reciprocating plunger head being slidably mounted relative to the frame and operable to reciprocate into and out of the chamber and apply a compressive force to the loose material; and
    a plunger drive, wherein the plunger drive includes a pair of planetary gear trains and a common drive shaft that powers both of the planetary gear trains, with each of the planetary gear trains drivingly connected to a corresponding one of the crank arms to cooperatively power the plunger assembly, wherein each of the planetary gear trains comprises a ring gear, a carrier, a plurality of planet gears, a corresponding plurality of shafts, and a sun gear.

2. The powered square baler of claim 1 further comprising a bevel gear set drivingly connecting the common drive shaft and both of the planetary gear trains.

3. The powered square baler of claim 2 wherein the bevel gear set includes a drive bevel gear, a driven bevel gear, and a hollow shaft, wherein rotation of the drive shaft causes corresponding rotation of the driven bevel gear, with the driven bevel gear serving to drive the planetary gear trains.

4. The powered square baler of claim 3 wherein each of the planetary gear trains transmits power from the bevel gear set to a corresponding one of the crank arms.

5. The powered square baler of claim 1 wherein the ring gears being spaced laterally from one another and substantially axially aligned with a lateral axis.

6. The powered square baler of claim 5, wherein each carrier includes a pair of plates and walls that interconnect the plates to cooperatively form a rigid gear carrying structure and present an open space between the plates, the plates presenting bores that receive the plurality of shafts, with the plurality planet gears being rotatably mounted on respective shafts within the space.

7. The powered square baler of claim 6, the carriers are axially aligned so that both carriers are rotatable about said lateral axis.

8. The powered square baler of claim 6, wherein rotation of the sun gear causes rotation of the plurality of planet gears, which causes rotation of the carrier, which moves the respective crank arm.

* * * * *